United States Patent
Willumstad et al.

(10) Patent No.: US 10,722,999 B2
(45) Date of Patent: Jul. 28, 2020

(54) HIGH REMOVAL RATE CHEMICAL MECHANICAL POLISHING PADS AND METHODS OF MAKING

(71) Applicants: Rohm and Haas Electronic Materials CMP Holdings, Inc., Newark, DE (US); Nitta Haas Incorporated, Osaka (JP); Dow Global Technologies LLC, Midland, MI (US)

(72) Inventors: Thomas P. Willumstad, Pearland, TX (US); Bainian Qian, Newark, DE (US); Rui Xie, Pearland, TX (US); Kenjiro Ogata, Osaka (JP); George C. Jacob, Newark, DE (US); Marty W. DeGroot, Middletown, DE (US)

(73) Assignees: Rohm and Haas Electronic Materials CMP Holdings, Inc., Newark, DE (US); Nitta Haas Inc., Osaka (JP); Dow Global Technologies LLC, Midland, MI (US)

(*) Notice: Subject to any disclaimer, the term of this patent is extended or adjusted under 35 U.S.C. 154(b) by 0 days.

(21) Appl. No.: 15/185,230

(22) Filed: Jun. 17, 2016

(65) Prior Publication Data
US 2017/0361421 A1    Dec. 21, 2017

(51) Int. Cl.
| C09K 3/14 | (2006.01) |
| B24B 37/24 | (2012.01) |
| C08G 18/32 | (2006.01) |
| C08G 18/48 | (2006.01) |
| C08G 18/80 | (2006.01) |
| C08G 18/76 | (2006.01) |
| C08G 18/10 | (2006.01) |
| B24D 3/00 | (2006.01) |
| B24D 11/00 | (2006.01) |
| B24D 18/00 | (2006.01) |

(52) U.S. Cl.
CPC ........... *B24B 37/24* (2013.01); *C08G 18/10* (2013.01); *C08G 18/3243* (2013.01); *C08G 18/4854* (2013.01); *C08G 18/7621* (2013.01); *C08G 18/808* (2013.01)

(58) Field of Classification Search
USPC .......................... 51/298, 293, 299
See application file for complete search history.

(56) References Cited

U.S. PATENT DOCUMENTS

| 3,252,848 | A | | 5/1966 | Borsellino | |
| 3,524,890 | A | * | 8/1970 | Cox | C08G 18/676 568/606 |
| 3,711,511 | A | | 1/1973 | Farah | |
| 3,711,571 | A | * | 1/1973 | Farah | C08G 18/12 525/458 |
| 3,947,426 | A | | 3/1976 | Lander | |
| 5,510,432 | A | * | 4/1996 | Schmalstieg | C08G 18/10 525/528 |
| 7,762,870 | B2 | | 7/2010 | Ono et al. | |
| 8,647,179 | B2 | | 2/2014 | Nakayama et al. | |
| 8,715,035 | B2 | | 5/2014 | Roy et al. | |
| 8,864,859 | B2 | | 10/2014 | Roy et al. | |
| 2013/0042536 | A1 | * | 2/2013 | McHugh | B24B 37/24 51/298 |
| 2014/0083018 | A1 | * | 3/2014 | Hendron | B24D 18/00 51/298 |
| 2015/0367478 | A1 | * | 12/2015 | Lefevre | B24B 37/26 451/56 |

FOREIGN PATENT DOCUMENTS

| JP | 2013252584 A | 12/2013 |
| JP | 05501722 B2 | 5/2014 |
| WO | 2015/037606 A1 | 3/2015 |

* cited by examiner

*Primary Examiner* — James E McDonough
(74) *Attorney, Agent, or Firm* — Blake T. Biederman; Andrew Merriam

(57) ABSTRACT

A chemical mechanical polishing pad for polishing a semiconductor substrate is provided containing a polishing layer that comprises a polyurethane reaction product of a reaction mixture comprising (i) one or more diisocyanate, polyisocyanate or polyisocyanate prepolymer, (ii) from 40 to 85 wt. % based on the total weight of (i) and (ii) of one or more blocked diisocyanate, polyisocyanate or polyisocyanate prepolymer which contains a blocking agent and has a deblocking temperature of from 80 to 160° C., and (iii) one or more aromatic diamine curative. The reaction mixture has a gel time at 80° C. and a pressure of 101 kPa of from 2 to 15 minutes; the polyurethane reaction product has a residual blocking agent content of 2 wt. % or less; and the polishing layer exhibits a density of from 0.6 to 1.2 g/cm$^3$.

3 Claims, No Drawings

HIGH REMOVAL RATE CHEMICAL MECHANICAL POLISHING PADS AND METHODS OF MAKING

The present invention relates to chemical mechanical polishing pads and methods of making and using the same. More particularly, the present invention relates to a chemical mechanical polishing pad comprising a polishing layer of a polyurethane reaction product of a reaction mixture comprising (i) one or more diisocyanate, polyisocyanate or polyisocyanate prepolymer wherein the prepolymer has an 8-16 wt. % NCO content, (ii) one or more blocked diisocyanate, polyisocyanate or polyisocyanate prepolymer which contains a blocking agent having a deblocking temperature of 80° C. or higher, or up to 160° C., such as pyrazoles, like dimethyl pyrazole (DMP), in the amount of from 40 to 85 wt. %, based on the total weight of all diisocyanates, polyisocyanates and polyisocyanate prepolymers in the reaction mixture, preferably, an aromatic blocked diisocyanate, polyisocyanate or polyisocyanate prepolymer, and (iii) one or more diamine curative, preferably, an aromatic diamine curative, such as 4,4'-methylenebis(3-chloro-2,6-diethylaniline) (MCDEA), wherein the reaction mixture has a gel time of from 2 to 15 minutes when mixed at a stoichiometric 1:1 ratio of total isocyanate groups to total amine groups at 80° C. and a pressure of 101 kPa, and the polyurethane reaction product has a residual blocking agent content of 2 wt. % or less.

Chemical mechanical planarization, or chemical mechanical polishing (CMP), is a common technique used to planarize or polish work pieces such as semiconductor wafers. In conventional CMP, a wafer carrier, or polishing head, is mounted on a carrier assembly. The polishing head holds the wafer and positions the wafer in contact with a polishing layer of a polishing pad that is mounted on a table or platen within a CMP apparatus. The carrier assembly provides a controllable pressure between the wafer and polishing pad. Simultaneously, a polishing medium (e.g., slurry) is dispensed onto the polishing pad and is drawn into the gap between the wafer and polishing layer. To effect polishing, the polishing pad and wafer typically rotate relative to one another. As the polishing pad rotates beneath the wafer, the wafer sweeps out a typically annular polishing track, or polishing region, wherein the wafer's surface directly confronts the polishing layer. The wafer surface is polished and made planar by chemical and mechanical action of the polishing layer and polishing medium on the surface.

Known CMP pads have been made from relatively large prepolymers that react relatively slowly with aromatic amines in a solvent-free casting process. Minimum gel time required for the casting process is about 2 minutes, thereby ruling out the use of faster reactive amines as chain extenders in CMP pad formulations, in particular for high hardness pads.

U.S. Pat. No. 7,762,870 B2 to Ono et al. discloses polishing pads having as a polishing layer a polyester having ionic groups, such as a one-component polyester urethane that can be made, in part, from a blocked (poly)isocyanate. An aqueous dispersion of the ionic group containing polyester is used to homogeneously disperse abrasive grains into the aqueous dispersion which is used to form the polishing layer of the pad. However, aqueous dispersion processing of urethanes generally requires that the polyurethanes are formed into aqueous dispersions prior forming the polishing layer and then processed by coagulation or other fluid phase change function, without further reaction.

The present inventors have sought to solve the problem of providing an effective chemical mechanical polishing pad having a polishing layer comprising a polyurethane from the reaction product of an at least partially blocked polyisocyanate without warping, cracking or surface deposits of a blocking agent.

STATEMENT OF THE INVENTION

1. In accordance with the present invention, chemical mechanical (CMP) polishing pads for polishing a substrate chosen from at least one of a magnetic substrate, an optical substrate and a semiconductor substrate comprise a polishing layer adapted for polishing the substrate which is a polyurethane reaction product of a reaction mixture comprising (i) one or more diisocyanate, polyisocyanate or polyisocyanate prepolymer, wherein the prepolymer has an 8-16 wt. % NCO content, in the amount of from 15 to 60 wt. % or, preferably, from 20 to 50 wt. %, based on the total weight of all diisocyanates, polyisocyanates and polyisocyanate prepolymers in the reaction mixture, preferably, an aromatic diisocyanate, polyisocyanate or polyisocyanate prepolymer, such as toluene diisocyanate, (ii) one or more blocked diisocyanate, polyisocyanate or polyisocyanate prepolymer which contains a blocking agent and has a deblocking temperature of from 80 to 160° C., or, preferably, 90 to 120° C., such as a pyrazole, like dimethyl pyrazole (DMP) or a dicarbonyl compound, like diethyl malonate, in the amount of from 40 to 85 wt. % or, preferably, from 50 to 80 wt. %, based on the total weight of all diisocyanates, polyisocyanates and polyisocyanate prepolymers in the reaction mixture, preferably, an aromatic blocked diisocyanate, polyisocyanate or polyisocyanate prepolymer, and (iii) one or more diamine curative, preferably, an aromatic diamine curative, such as 4,4'-methylenebis(3-chloro-2,6-diethylaniline) (MCDEA), wherein the reaction mixture has a gel time at 80° C. and a pressure of 101 kPa of from 2 to 15 minutes or, preferably, from 3 to 10 minutes, or, more preferably, 4 to 8 minutes, and, further wherein, the polyurethane reaction product has a residual blocking agent content of 2 wt. % or less or, preferably, 1 wt. % or less, and, still further wherein, the polishing layer exhibits a density of from 0.6 to 1.2 g/cm$^3$.

2. In accordance with the CMP polishing pads of the present invention as in item 1, above, wherein the (i) one or more diisocyanate, polyisocyanate or polyisocyanate prepolymer is chosen from 1,3-phenylene diisocyanate, 1,4-phenylene diisocyanate, 1,5-naphthylene diisocyanate, toluidine diisocyanate, 2,6-tolylene diisocyanate, 2,4-tolylene diisocyanate (2,4-TDI), 2,4'-diphenylmethane diisocyanate (2,4'-MDI), 4,4'-diphenylmethane diisocyanate, mixtures of diphenylmethane diisocyanates (MDI) and oligomeric diphenylmethane diisocyanates (polymer MDI), xylylene diisocyanate, tetramethylxylylene diisocyanate, triisocyanatotoluene and prepolymers thereof made with the diisocyanate or polyisocyanate and one or more polyol.

3. In accordance with the CMP polishing pads of the present invention as in any one of items 1 or 2, above, wherein the (ii) one or more blocked diisocyanate, polyisocyanate or polyisocyanate prepolymer is chosen from blocked 1,3-phenylene diisocyanate, blocked 1,4-phenylene diisocyanate, blocked 1,5-naphthylene diisocyanate, blocked toluidine diisocyanate, blocked 2,6-tolylene diisocyanate, blocked 2,4-tolylene diisocyanate (2,4-TDI), blocked 2,4'-diphenylmethane diisocyanate (2,4'-MDI), blocked 4,4'-diphenylmethane diisocyanate, the mixtures of blocked diphenylmethane diisocyanates (MDI) and blocked oligomeric diphenylmethane diisocyanates (polymer MDI), blocked xylylene diisocyanate, blocked tetramethylxylylene diisocyanate, blocked triisocyanatotoluene and blocked prepolymers thereof made with the diisocyanate or polyisocyanate and one or more polyol.

4. In accordance with the CMP polishing pads of the present invention as in any one of items 1, 2, or 3, above, wherein the (ii) one or more blocked diisocyanate, polyisocyanate or polyisocyanate prepolymer is the reaction product of the diisocyanate, polyisocyanate or polyisocyanate prepolymer with a blocking agent chosen from ethyl acetoacetate, diethyl malonate, diisopropylamine, methyl ethyl ketoxime, cyclohexanone oxime, ε-caprolactam, 1,2,4-triazole, phenol or substituted phenols, and 3,5-dimethylpyrazole, preferably, 3,5-dimethylpyrazole.

5. In accordance with the CMP polishing pads of the present invention as in any one of items 1, 2, 3 or 4, above, wherein the one or more diamine curative is chosen from 4,4'-methylene-bis(3-chloro-2,6-diethylaniline); diethyl toluene diamines; t-butyl toluene diamines, such as 5-tert-butyl-2,4- or 3-tert-butyl-2,6-toluenediamine; chlorotoluenediamines; dimethylthio-toluene diamines; 1,2-bis(2-aminophenylthio)ethane, trimethylene glycol di-p-aminobenzoate; tert-amyl toluenediamines, such as 5-tert-amyl-2,4- and 3-tert-amyl-2,6-toluenediamine; tetramethyleneoxide di-p-aminobenzoate; (poly)propyleneoxide di-p-aminobenzoates; chloro diaminobenzoates; methylene dianilines, such as 4,4'-methylene-bis-aniline; isophorone diamine; 1,2-diaminocyclohexane, bis(4-aminocyclohexyl)methane, 4,4'-diaminodiphenyl sulfone, m-phenylenediamine; xylene diamines; 1,3-bis(aminomethyl cyclohexane); and mixtures thereof, preferably 4,4'-methylene-bis(3-chloro-2,6-diethylaniline).

6. In accordance with the CMP polishing pads of the present invention as in any one of items 1, 2, 3, 4, or 5, above, wherein the polishing pad has a free isocyanate content of 0.1 wt. %, or less, based on the total weight of the polyurethane reaction product.

7. In accordance with the CMP polishing pad of the present invention as in any of items 1, 2, 3, 4, 5, or 6, above, wherein the stoichiometric ratio of the sum of the amine ($NH_2$) groups and the hydroxyl (OH) groups in the (iii) amine curative plus any free hydroxyl groups in the reaction mixture to the unreacted and blocked isocyanate groups in reaction mixture is from 0.80:1 to 1.20:1, or, preferably 0.95:1 to 1.05:1.

8. In accordance with the CMP polishing pad of the present invention as in any of items 1, 2, 3, 4, 5, 6, or 7, above, wherein the polishing layer of the polishing pad further comprises microelements chosen from entrapped gas bubbles, hollow core polymeric materials, such as polymeric microspheres, and liquid filled hollow core polymeric materials, such as fluid-filled polymeric microspheres, preferably, expanded fluid-filled polymeric microspheres.

9. In accordance with the CMP polishing pad of the present invention as in item 8, above, wherein the amount of polymeric microspheres ranges from 0 to 50 volume %, measured as porosity, or, preferably, 5 to 35 volume %, based on the total volume of the polishing layer.

10. In another aspect, the present invention provides methods for making CMP polishing pads having a polishing layer adapted for polishing a substrate comprising providing one or more diisocyanate, polyisocyanate or polyisocyanate prepolymer, preferably one or more aromatic diisocyanate, polyisocyanate or polyisocyanate prepolymer, that has a viscosity of 100 to 2000 mPa·s (milliPascal·s), more preferably 200 to 1000 mPa·s when measured at 80° C., wherein the prepolymer has an 8-16 wt. % NCO content; forming (ii) a blocked diisocyanate, polyisocyanate or polyisocyanate prepolymer, preferably, an aromatic diisocyanate, polyisocyanate or polyisocyanate prepolymer by reacting the one or more diisocyanate, polyisocyanate or polyisocyanate prepolymer with a blocking agent which has a deblocking temperature of from 80 to 160° C., mixing the blocked diisocyanate, polyisocyanate or polyisocyanate prepolymer with (i) a non-blocked diisocyanate, polyisocyanate or polyisocyanate prepolymer, preferably, a non-blocked aromatic diisocyanate, polyisocyanate or polyisocyanate prepolymer, in a weight ratio of from 5.66:1 to 2:3 or, preferably from 4:1 to 1:1; of (ii) to (i) to form a partially blocked isocyanate mixture; forming an organic solvent free and substantially water-free, or, preferably, water free reaction mixture by mixing at a pressure of from 0.1 MPa to 3.0 MPa the partially blocked isocyanate mixture with (iii) one or more diamine curative, preferably, an aromatic diamine curative, such as 4,4'-methylenebis(3-chloro-2,6-diethylaniline) (MCDEA), and from 0 to 50 volume %, or, preferably, from 5 to 35 volume % of one or more microelements chosen from entrapped gas bubbles, hollow core polymeric materials, and liquid filled hollow core polymeric materials, based on the total volume of the reaction mixture and the microelements, wherein the reaction mixture absent the microelements has a gel time at 80° C. and a pressure of 101 kPa of from 2 to 15 minutes or, preferably, from 3 to 10 minutes, or, more preferably, from 4 to 8 minutes; casting the reaction mixture into a desired shape, such as a cake, and curing the reaction mixture at a temperature above the deblocking temperature of the blocking agent to form a polyurethane; forming a polishing layer from the cast polyurethane; and, post-curing the polishing layer at above the deblocking temperature of the blocking agent, such as from 85 to 165° C., or, from 95 to 125° C., for a sufficient time, such as from 2 to 30 hours, or, preferably, from 4 to 20 hours to remove residual blocking agent to a level no more than 2 wt. %, or, preferably, less than 1 wt. %, based on the total weight of the polyurethane polishing layer, wherein the polishing layer exhibits a density of from 0.6 to 1.2 $g/cm^3$.

11. In accordance with the methods of the present invention as in item 10, above, wherein the (i) one or more diisocyanate, polyisocyanate or polyisocyanate prepolymer is chosen from 1,3-phenylene diisocyanate, 1,4-phenylene diisocyanate, 1,5-naphthylene diisocyanate, toluidine diisocyanate, 2,6-tolylene diisocyanate, 2,4-tolylene diisocyanate (2,4-TDI), 2,4'-diphenylmethane diisocyanate (2,4'-MDI), 4,4'-diphenylmethane diisocyanate, mixtures of diphenylmethane diisocyanates (MDI) and oligomeric diphenylmethane diisocyanates (polymer MDI), xylylene diisocyanate, tetramethylxylylene diisocyanate, triisocyanatotoluene and prepolymers thereof made with the diisocyante or polyisocyanate and one or more polyol.

12. In accordance with the methods of the present invention as in any one of items 10 or 11, above, wherein the (ii) one or more blocked diisocyanate, polyisocyanate or polyisocyanate prepolymer is chosen from blocked 1,3-phenylene diisocyanate, blocked 1,4-phenylene diisocyanate, blocked 1,5-naphthylene diisocyanate, blocked toluidine diisocyanate, blocked 2,6-tolylene diisocyanate, blocked 2,4-tolylene diisocyanate (2,4-TDI), blocked 2,4'-diphenylmethane diisocyanate (2,4'-MDI), blocked 4,4'-diphenylmethane diisocyanate, the mixtures of blocked diphenylmethane diisocyanates (MDI) and blocked oligomeric diphenylmethane diisocyanates (polymer MDI), blocked xylylene diisocyanate, blocked tetramethylxylylene diisocyanate, blocked triisocyanatotoluene and blocked prepolymers thereof made with one or more polyol.

13. In accordance with the methods of the present invention as in any one of items 10, 11, or 12, above, wherein the (ii) one or more blocked diisocyanate, polyisocyanate or polyisocyanate prepolymer is the reaction product of the diisocyanate, polyisocyanate or polyisocyanate prepolymer with a blocking agent chosen from ethyl acetoacetate, diethyl malonate, diisopropylamine, methyl ethyl ketoxime, cyclohexanone oxime, ε-caprolactam, 1,2,4-triazole, phenol or substituted phenols, and 3,5-dimethylpyrazole, preferably 3,5-dimethylpyrazole.

14. In accordance with the methods of the present invention as in any one of items 10, 11, 12 or 13, above, wherein the (iii) one or more diamine curative is chosen from 4,4'-methylene-bis(3-chloro-2,6-diethylaniline); aromatic diamines that contain only carbon, nitrogen, hydrogen and oxygen atoms, such as dialkyl toluene diamines, like diethyl toluene diamine ort-butyl toluene diamine, and trimethylene glycol di-p-amino-benzoate; aromatic diamines that contain only carbon, nitrogen, and hydrogen atoms, such as methylene dianiline, isophorone diamine, 1,2-diaminocyclohexane, bis(4-aminocyclohexyl)methane, m-phenylenediamine, xylene diamine, 1,3-bis(aminomethyl cyclohexane); dimethylthio-toluene diamine, 4,4'-diaminodiphenyl sulfone; and mixtures thereof, preferably 4,4'-methylene-bis(3-chloro-2,6-diethylaniline).

15. In accordance with the methods of the present invention as in any of items 10, 11, 12, 13 or 14, above, wherein the stoichiometric ratio of the sum of the amine ($NH_2$) groups and the hydroxyl (OH) groups) in the (iii) amine curative plus any free hydroxyl groups in the reaction mixture to the unreacted and blocked isocyanate groups in reaction mixture is from 0.80:1 to 1.20:1, or, preferably, from 0.95:1 to 1.05:1.

16. In accordance with the methods of the present invention as in any of items 10, 11, 12, 13, 14, or 15, above, wherein the forming the polishing layer from the cast polyurethane comprises skiving a cake to form a polishing layer having a desired thickness.

17. In accordance with the methods of the present invention as in any of items 10, 11, 12, 13, 14, or 15, above, wherein the casting the reaction mixture forms a cast polyurethane cake, and the forming the polishing layer from the cast polyurethane cake comprises skiving the cast polyurethane cake to form a polishing layer having a desired thickness.

18. In accordance with the methods of the present invention as in item 17, above, wherein the forming of the polishing pad further comprises stacking a sub pad layer, such as a polymer impregnated non-woven, or polymer sheet, onto bottom side of a polishing layer so that the polishing layer forms the top of the polishing pad.

19. In yet another aspect, the present invention provides methods of polishing a substrate, comprising: providing a substrate selected from at least one of a magnetic substrate, an optical substrate and a semiconductor substrate; providing a chemical mechanical (CMP) polishing pad according to any one of items 1 to 7, above; creating dynamic contact between a polishing surface of the polishing layer of the CMP polishing pad and the substrate to polish a surface of the substrate; and, conditioning of the polishing surface of the polishing pad with an abrasive conditioner.

Unless otherwise indicated, conditions of temperature and pressure are ambient temperature and standard pressure. All ranges recited are inclusive and combinable.

Unless otherwise indicated, any term containing parentheses refers, alternatively, to the whole term as if no parentheses were present and the term without them, and combinations of each alternative. Thus, the term "(poly) isocyanate" refers to isocyanate, polyisocyanate, or mixtures thereof.

All ranges are inclusive and combinable. For example, the term "a range of 50 to 3000 cPs, or 100 or more cPs" would include each of 50 to 100 cPs, 50 to 3000 cPs and 100 to 3000 cPs.

As used herein, the term "ASTM" refers to publications of ASTM International, West Conshohocken, Pa.

As used herein, the term "gel time" means the result obtained by mixing a given reaction mixture at about 80° C., for example, in an VM-2500 vortex lab mixer (StateMix Ltd., Winnipeg, Canada) set at 1000 rpm for 30 s, setting a timer to zero and switching the timer on, pouring the mixture into an aluminum cup, placing the cup into a hot pot of a gel timer (Gardco Hot Pot™ gel timer, Paul N. Gardner Company, Inc., Pompano Beach, Fla.) set at 65° C., stirring the reaction mixture with a wire stirrer at 20 RPM and recording the gel time when the wire stirrer stops moving in the sample.

As used herein, the term "deblocking temperature" for a given blocking agent means the temperature below which at a 101 kPa pressure a blocked diisocyanate, polyisocyanate or polyisocyanate prepolymer has negligible reaction with a curative in a mixture having a 1:1 stoichiometric ratio of isocyanate to active hydrogen groups and at which the blocked diisocyanate, polyisocyanate or polyisocyanate prepolymer starts to deblock and react substantially with the curative.

As used herein, the term "elongation to break" is the ratio between changed length and initial length after breakage of a test specimen, and tested in accordance with ASTM D412-06a (2006), "Standard Test Methods for Vulcanized Rubber and Thermoplastic Elastomers—Tension."

As used herein, the terms G', G", and G"/G', respectively, refer to shear storage modulus, shear loss modulus, and the ratio of the shear loss modulus to the shear storage modulus. Test specimens were cut with 6.5 mm width and 36 mm length. An Aries™ G2 torsional rheometer or a Rheometric Scientific™ RDA3 (both from TA Instruments, New Castle, Del.) were used in accordance with ASTM D5279-13 (2013), "Standard Test Method for Plastics: Dynamic Mechanical Properties: In Torsion." The gap separation was 20 mm. Instrument analysis parameters were set at 100 g of preload, 0.2% strain, oscillation speed of 10 rads/sec, and temperature ramp rate of 3° C./min from −100° C. to 150° C.

As used herein, the term "polyisocyanate" means any isocyanate group containing molecule having three or more isocyanate groups, including blocked isocyanate groups.

As used herein, the term "polyisocyanate prepolymer" means any isocyanate group containing molecule that is the reaction product of an excess of a diisocyanate or polyisocyanate with an active hydrogen containing compound containing two or more active hydrogen groups, such as diamines, diols, triols, and polyols.

As used herein, the term "Shore D hardness" is the hardness of a given material as measured according to ASTM D2240-15 (2015), "Standard Test Method for Rubber Property—Durometer Hardness". Hardness was measured on a Rex Hybrid hardness tester (Rex Gauge Company, Inc., Buffalo Grove, Ill.), equipped with a D probe. Six samples were stacked and shuffled for each hardness measurement.

As used herein, the term "tensile strength" refers to the maximum stress that a given material can withstand while being stretched or pulled before breaking, as measured in accordance with ASTM D412-06a (2006), "Standard Test Methods for Vulcanized Rubber and Thermoplastic Elastomers—Tension."

As used herein, unless otherwise indicated, the term "viscosity" refers to the viscosity of a given material in neat form (100%) at a given temperature as measured using a rheometer, set at an oscillatory shear rate sweep from 0.1-100 rad/sec in a 50 mm parallel plate geometry with a 100 μm gap.

As used herein, unless otherwise indicated, the term "wt. % NCO" refers to the amount as reported on a spec sheet or MSDS for a given NCO group or blocked NCO group containing product.

As used herein, the term "wt. %" stands for weight percent.

In accordance with the present invention, a chemical mechanical (CMP) polishing pad has a top polishing surface comprising a reaction product of a reaction mixture of a blocked or partially blocked isocyanate-terminated prepolymer and a diamine curative agent, in particular 4,4'-methylenebis(3-chloro-2,6-diethylaniline) (MCDEA). The polishing pads of the present invention comprise polyurethane reaction products of amines that were previously too reactive for use in making CMP polishing pads. The polishing pads preferably have a top polishing surface comprising a polyurethane reaction product of a blocked isocyanate-terminated prepolymer and a diamine curing agent. The CMP polishing pads of the present invention have demonstrated high removal rates and good planarization efficiency. The polishing pads are useful for 3D NAND memory polishing applications.

The chemical mechanical polishing pads of the present invention comprise a polishing layer which is a homogenous dispersion of microelements in a porous polyurethane, or a homogeneous polyurethane. Homogeneity is important in achieving consistent polishing pad performance, especially where a single casting is used to make multiple polishing pads. Accordingly, the reaction mixture of the present invention is chosen so that the resulting pad morphology is stable and easily reproducible. For example, it is often important to control additives such as anti-oxidizing agents, and impurities such as water for consistent manufacturing. Because water reacts with isocyanate to form gaseous carbon dioxide and a weak reaction product relative to urethanes generally, controlling the water concentration can affect the concentration of carbon dioxide bubbles that form pores in the polymeric matrix as well as the overall consistency of the polyurethane reaction product. Isocyanate reaction with adventitious water also reduces the available isocyanate for reacting with chain extender, so changes the stoichiometry along with level of crosslinking (if there is an excess of isocyanate groups) and tends to lower resulting polymer molecular weight.

To insure homogeneity and good molding results and fill the mold completely, the reaction mixture of the present invention should be well dispersed and have a gel time under reaction temperature and pressure conditions of 15 minutes or less, or, preferably, 10 minutes or less. Such a gel time allows the reaction mixture to flow into a mold without being so long as to cause microelements such as hollow core polymeric microspheres or pores to rise up or segregation in a polishing pad. On the other hand, if the gel time is too short, it can become difficult to completely fill the mold before the material gels or in extreme cases, polishing pads can become warped or cracked. Generally, the reaction mixture of the present invention has a gel time of from 2 to 15 minutes or, preferably, from 3 to 10 minutes.

In accordance with the present invention, a reaction mixture comprises at least a (i) diisocyanate, polyisocyanate or polyisocyanate prepolymer, (ii) blocked diisocyanate, polyisocyanate or polyisocyanate prepolymer and (iii) one or more diamine curative which reaction mixture has a gel time of at least 20% shorter or up to 60% shorter, or, preferably, at least 30% shorter than the same reaction mixture comprising 4,4'-methylene-bis-o-(2-chloroaniline) (MbOCA) as the (iii) diamine curative.

The reaction mixture of the present invention is free of added organic solvents.

Preferably, the reaction mixture of the present invention is substantially water free (less than 2,000 ppm), based on the total weight of the reaction mixture.

The (iii) diamine curative of the present invention comprises a diamine that is more reactive, as measured by gel time, than 4,4'-methylene-bis-(2-chloroaniline) (MBOCA) at a given reaction temperature when combined in the same amounts, with the same mixture of a diisocyanate, polyisocyanate or polyisocyanate prepolymer and a blocked diisocyanate, polyisocyanate or polyisocyanate prepolymer and 101 kPa. At the same time, the diamine curative must provide a gel time within the scope of the present invention. Examples of suitable diamine curatives are 4,4'-methylenebis(3-chloro-2,6-diethylaniline) (MCDEA) or dialkyl-toluene diamines, such as a mixture of 3,5-diethyltoluene-2,4-diamine and 3,5-diethyltoluene-2,6-diamine. Aliphatic diamines generally react too fast for bulk polymerization to form chemical mechanical polishing pads.

The (i) diisocyanate, polyisocyanate or polyisocyanate prepolymer used in the formation of the polishing layer of the chemical mechanical polishing pad of the present invention may be a diisocyanate selected from the group consisting of 2,4-toluene diisocyanate; 2,6-toluene diisocyanate; 4,4'-diphenylmethane diisocyanate; naphthalene-1,5-diisocyanate, toluidine diisocyanate; para-phenylene diisocyanate; xylylene diisocyanate; isophorone diisocyanate; hexamethylene diisocyanate; 4,4'-dicyclohexylmethane diisocyanate; cyclohexanediisocyanate; and, mixtures thereof.

Preferably, the diisocyanate, polyisocyanate or polyisocyanate prepolymer used in the formation of the polishing layer of the chemical mechanical polishing pad of the present invention contains two reactive isocyanate groups (i.e., NCO).

Preferably, the (i) diisocyanate, polyisocyanate or polyisocyanate prepolymer used in the formation of the polishing layer of the chemical mechanical polishing pad of the present invention is chosen from or formed from an aromatic diisocyanate, polyisocyanate or polyisocyanate prepolymer and mixtures thereof with an aliphatic diisocyanate, polyisocyanate or polyisocyanate prepolymer.

Preferably, the (i) diisocyanate, polyisocyanate or polyisocyanate prepolymer used in the formation of the polishing layer of the chemical mechanical polishing pad of the present invention is an isocyanate terminated urethane prepolymer formed by the reaction of a diisocyanate with a prepolymer polyol and having two reactive isocyanate groups.

Preferably, the (i) polyisocyanate prepolymer used in the formation of the polishing layer of the chemical mechanical polishing pad of the present invention has 6 to 16 wt. % unreacted isocyanate (NCO) groups, or, more preferably, from 7 to 14 wt. %, or, still more preferably, from 8 to 12 wt. %, or, most preferably, from 8 to 10 wt. % of unreacted isocyanate (NCO) groups.

In accordance with the present invention preparation of a polyisocyanate prepolymer comprises extending an aromatic diisocyanate or polyisocyanate with a polyol.

As used herein, the term "polyol" includes diols, polyols, polyol-diols, copolymers thereof and mixtures thereof.

Examples of suitable polyols include polyether polyols, such as, poly(oxytetramethylene)glycol, poly(oxypropylene)glycol and mixtures thereof, polycarbonate polyols, polyester polyols, polycaprolactone polyols and mixtures thereof. Such polyols can be mixed with low molecular weight polyols, including ethylene glycol, 1,2-propylene glycol, 1,3-propylene glycol, 1,2-butanediol, 1,3-butanediol, 2-methyl-1, 3-propanediol, 1,4-butanediol, neopentyl glycol, 1,5-pentanediol, 3-methyl-1,5-pentanediol, 1,6-hexanediol, diethylene glycol, dipropylene glycol, tripropylene glycol and mixtures thereof.

Examples of suitable aromatic diisocyanates or polyisocyanates include aromatic diisocyanates, such as, 2,4-toluene diisocyanate, 2,6-toluene diisocyanate, 4,4'-diphenylmethane diisocyanate, naphthalene-1,5-diisocyanate, toluidine diisocyanate, para-phenylene diisocyanate, xylylene diisocyanate and mixtures thereof. Generally, a polyfunctional aromatic isocyanate contains less than 20 wt. % aliphatic isocyanates, such as 4,4'-dicyclohexylmethane diisocyanate, isophorone diisocyanate and cyclohexanediisocyanate, based on the total weight of the total (i). Preferably, the aromatic diisocyanate or polyisocyanate contains less than 15 wt. % aliphatic isocyanates and more preferably, less than 12 wt. % aliphatic isocyanate.

Preferably, the polyol is selected from the group comprising polytetramethylene ether glycol (PTMEG), polypropylene ether glycol (PPG), polyester polyols, such as ethylene or butylene adipates, polypropylene ether glycols, polycaprolactone polyols, copolymers thereof and mixtures thereof.

Available examples of PTMEG family polyols are as follows: Terathane™ 2900, 2000, 1800, 1400, 1000, 650 and 250 from Invista, Wichita, Kans.; Polymeg™ 2900, 2000, 1000, 650 from Lyondell Chemicals, Limerick, Pa.; PolyTHF™ 650, 1000, 2000 from BASF Corporation, Florham Park, N.J., and lower molecular weight species such as 1,2-butanediol, 1,3-butanediol, and 1,4-butanediol. Available examples of PPG polyols are as follows: Arcol™ PPG-425, 725, 1000, 1025, 2000, 2025, 3025 and 4000 from Covestro, Pittsburgh, Pa.; Voranol™ 1010L, 2000L, and P400 from Dow, Midland, Mich., Desmophen™ 1110BD or Acclaim™ Polyol 12200, 8200, 6300, 4200, 2200, each from Covestro. Available examples of ester polyols are as follows: Millester™ 1, 11, 2, 23, 132, 231, 272, 4, 5, 510, 51, 7, 8, 9, 10, 16, 253, from Polyurethane Specialties Company, Inc. Lyndhurst, N.J.; Desmophen™ 1700, 1800, 2000, 2001KS, 2001K2, 2500, 2501, 2505, 2601, PE65B from Covestro; Rucoflex™ S-1021-70, S-1043-46, S-1043-55 from Covestro.

To increase the reactivity of a polyol with a diisocyanate or polyisocyanate to make a polyisocyanate prepolymer, a catalyst may be used. Suitable catalysts include, for example, oleic acid, azelaic acid, dibutyltindilaurate, 1,8-Diazabicyclo[5.4.0]undec-7-ene (DBU), tertiary amine catalysts, such as Dabco TMR, and mixture of the above.

The (i) diisocyanate, polyisocyanate or polyisocyanate prepolymer of the present invention has a viscosity in neat form of 10,000 mPa·s or less at 110° C. or, preferably, from 20 to 5,000 mPa·s.

Preferably, the isocyanate-terminated urethane prepolymer used in the formation of the polishing layer of the chemical mechanical polishing pad of the present invention exhibits a number average molecular weight, MN, of 400 to 5,000 (more preferably 400 to 4,000; most preferably 400 to 2,500).

Preferably the prepolymer polyol used to form the polyfunctional isocyanate terminated urethane prepolymer is selected from the group consisting of diols, polyols, polyol diols, copolymers thereof and mixtures thereof. More preferably, the prepolymer polyol is selected from the group consisting of polyether polyols (e.g., poly(oxytetramethylene)glycol, poly(oxypropylene)glycol and mixtures thereof); polycarbonate polyols; polyester polyols; polycaprolactone polyols; mixtures thereof; and, mixtures thereof with one or more low molecular weight polyols selected from the group consisting of ethylene glycol; 1,2-propylene glycol; 1,3-propylene glycol; 1,2-butanediol, 1,3-butanediol, 2-methyl-1,3-propanediol, 1,4-butanediol, neopentyl glycol; 1,5-pentanediol, 3-methyl-1,5-pentanediol, 1,6-hexanediol, diethylene glycol; dipropylene glycol; and, tripropylene glycol. Still more preferably, the prepolymer polyol is selected from the group consisting of polytetramethylene ether glycol (PTMEG); ester based polyols (such as ethylene adipates, butylene adipates); polypropylene ether glycols (PPG); polycaprolactone polyols; copolymers thereof; and, mixtures thereof. Most preferably, the prepolymer polyol is selected from the group consisting of PTMEG and PPG.

Preferably, when the prepolymer polyol is PTMEG, the isocyanate terminated urethane prepolymer has an unreacted isocyanate (NCO) concentration of 6 to 16 wt % (more preferably of 7 to 14 wt. %; most preferably 8 to 10 wt. %). Examples of commercially available PTMEG based isocyanate terminated urethane prepolymers include Imuthane™ prepolymers (available from COIM USA, Inc., West Deptford, N.J.) such as, PET-80A, PET-85A, PET-90A, PET-93A, PET-95A, PET-60D, PET-70D, PET-75D; Adiprene™ prepolymers (Chemtura, Philadelphia, Pa.), such as, for example, LF 800A, LF 900A, LF 910A, LF 930A, LF 931A, LF 939A, LF 950A, LF 952A, LF 600D, LF 601D, LF 650D, LF 667, LF 700D, LF750D, LF751D, LF752D, LF753D and L325); Andur™ prepolymers (Anderson Development Company, Adrian, Mich.), such as, 70APLF, 80APLF, 85APLF, 90APLF, 95APLF, 60DPLF, 70APLF, 75APLF).

Preferably, when the prepolymer polyol is PPG, the isocyanate terminated urethane prepolymer has an unreacted isocyanate (NCO) concentration of 6 to 16 wt. % (more preferably 7 to 14 wt. %, most preferably 8 to 10 wt. %). Examples of commercially available PPG based isocyanate terminated urethane prepolymers include Imuthane™ prepolymers (COIM USA, Inc.), such as, PPT-80A, PPT-90A, PPT-95A, PPT-65D, PPT-75D); Adiprene™ prepolymers (Chemtura), such as, LFG 963A, LFG 964A, LFG 740D); and, Andur™ prepolymers (Anderson Development Company), such as, 8000APLF, 9500APLF, 6500DPLF, 7501DPLF).

Preferably, the polyisocyanate prepolymer used in the formation of the polishing layer of the chemical mechanical polishing pad of the present invention is a low free isocyanate terminated urethane prepolymer having less than 0.1 wt % free toluene diisocyanate (TDI) monomer content.

The (ii) blocked diisocyanate, polyisocyanate or polyisocyanate prepolymer of the present invention is formed by heating the diisocyanate, polyisocyanate or polyisocyanate prepolymer in the presence of a blocking agent having a deblocking temperature of from 80 to 160° C., or, preferably, from 90 to 120° C. to a temperature below the deblocking temperature of the blocking agent but sufficiently high to make the diisocyanate, polyisocyanate or polyisocyanate prepolymer flow and react with the blocking agent. Suitable temperatures are 10 to 30° C. below the deblocking temperature of a blocking agent. The endpoint of the blocking reaction is monitored by FTIR and determined by the disappearance of the NCO peak at 2267 cm$^{-1}$.

Suitable blocking agents are pyrazoles, dicarbonyl compounds and oximes, like methyl ethyl ketoxime, preferably pyrazoles and dicarbonyl compounds. Other blocking agents include, such as, for example, ethyl acetoacetate, diethyl malonate, diisopropylamine, cyclohexanone oxime, ε-caprolactam, 1,2,4-triazole, phenol or substituted phenols, and 3,5-dimethylpyrazole. The amides and amines have deblocking temperatures above 120° C. and as high as 160° C.

In the reaction mixture of the present invention, the stoichiometric ratio of the sum of the total amine ($NH_2$) groups and the total hydroxyl (OH) groups) in the reaction mixture to the sum of the unreacted isocyanate (NCO) groups and the blocked isocyanate (NCO) groups in the reaction mixture is 0.80:1 to 1.20:1, or, preferably, from 0.85:1 to 1.10:1, or, most preferably, from 0.95:1 to 1.05:1.

The polishing layer of the chemical mechanical polishing pad of the present invention can be provided in both porous and nonporous (i.e., unfilled) configurations. The polishing layer of the chemical mechanical polishing pad of the present invention exhibits a density of ≥0.6 g/cm$^3$ as measured according to ASTM D1622-08 (2008). Thus, the polishing layer of the chemical mechanical polishing pad of the present invention exhibits a density of 0.6 to 1.2 g/cm$^3$, or, preferably, 0.7 to 1.1 g/cm$^3$, or, more preferably, 0.75 to 1.0 g/cm$^3$) as measured according to ASTM D1622-08 (2008).

The polishing layer of the chemical mechanical polishing pad of the present invention optionally further comprises microelements which, preferably, are uniformly dispersed throughout the polishing layer. Preferably, the microelements are selected from entrapped gas bubbles, hollow core polymeric materials, such as polymeric microspheres, liquid filled hollow core polymeric materials, such as fluid filled polymeric microspheres, water soluble materials and an insoluble phase material (e.g., mineral oil). More preferably, the microelements are selected from entrapped gas bubbles and hollow core polymeric materials uniformly distributed throughout the polishing layer. Preferably, the microelements have a weight average diameter of less than 150 μm (more preferably of less than 100 μm; most preferably of 5 to 50 μm). Preferably, the plurality of microelements comprise polymeric microspheres with shell walls of either polyacrylonitrile or a polyacrylonitrile copolymer (e.g., Expancel™ beads from Akzo Nobel, Amsterdam, Netherlands).

In accordance with the present invention, the microelements are incorporated into the polishing layer at 0 to 50 vol. % porosity, or, preferably, 5 to 35 vol. % porosity.

The polishing layer of the chemical mechanical polishing pad of the present invention exhibits a Shore D hardness of 40 to 90 as measured according to ASTM D2240-15 (2015), or, preferably, from 55 to 85, or, more preferably 60 to 80.

Polishing layers exhibiting a Shore D hardness of less than 40 typically have very high elongation to break values (i.e., >600%). Materials exhibiting such high elongation to break values reversibly deform when subjected to machining operations, which results in groove formation that is unacceptably poor and texture creation during diamond conditioning that is insufficient. Preferably, the polishing layer of the chemical mechanical polishing pad of the present invention exhibits an elongation to break of from 100 to 450% or, preferably, from 125 to 425% (still more preferably 150 to 300%; most preferably 150 to 200%) as measured according to ASTM D412-06a (2006).

Preferably, the polishing layer used in the chemical mechanical polishing pad of the present invention has an average thickness of from 500 to 3750 microns (20 to 150 mils), or, more preferably, from 750 to 3150 microns (30 to 125 mils), or, still more preferably, from 1000 to 3000 microns (40 to 120 mils), or, most preferably, from 1250 to 2500 microns (50 to 100 mils).

The chemical mechanical polishing pad of the present invention optionally further comprises at least one additional layer interfaced with the polishing layer. Preferably, the chemical mechanical polishing pad optionally further comprises a compressible sub pad or base layer adhered to the polishing layer. The compressible base layer preferably improves conformance of the polishing layer to the surface of the substrate being polished.

The polishing layer of the chemical mechanical polishing pad of the present invention has a polishing surface adapted for polishing the substrate. Preferably, the polishing surface has macrotexture selected from at least one of perforations and grooves. Perforations can extend from the polishing surface part way or all the way through the thickness of the polishing layer.

Preferably, grooves are arranged on the polishing surface such that upon rotation of the chemical mechanical polishing pad during polishing, at least one groove sweeps over the surface of the substrate being polished.

Preferably, the polishing surface has macrotexture including at least one groove selected from the group consisting of curved grooves, linear grooves, perforations and combinations thereof.

Preferably, the polishing layer of the chemical mechanical polishing pad of the present invention has a polishing surface adapted for polishing the substrate, wherein the polishing surface has a macrotexture comprising a groove pattern formed therein. Preferably, the groove pattern comprises a plurality of grooves. More preferably, the groove pattern is selected from a groove design, such as one selected from the group consisting of concentric grooves (which may be circular or spiral), curved grooves, cross hatch grooves (e.g., arranged as an X-Y grid across the pad surface), other regular designs (e.g., hexagons, triangles), tire tread type patterns, irregular designs (e.g., fractal patterns), and combinations thereof. More preferably, the groove design is selected from the group consisting of random grooves, concentric grooves, spiral grooves, crosshatched grooves, X-Y grid grooves, hexagonal grooves, triangular grooves, fractal grooves and combinations thereof. Most preferably, the polishing surface has a spiral groove pattern formed therein. The groove profile is preferably selected from rectangular with straight side walls or the groove cross section may be "V" shaped, "U" shaped, saw-tooth, and combinations thereof.

The methods of making a chemical mechanical polishing pad of the present invention may comprise providing a mold; pouring the reaction mixture of the present invention into the mold; and, allowing the combination to react in the mold to form a cured cake; wherein the polishing layer is derived from the cured cake. Preferably, the cured cake is skived to derive multiple polishing layers from a single cured cake. Optionally, the method further comprises heating the cured cake to facilitate the skiving operation. Preferably, the cured cake is heated using infrared heating lamps during the skiving operation in which the cured cake is skived into a plurality of polishing layers. After skiving, the polishing layers are heated or baked to remove the remaining blocking agent to below 2 wt. %, based on the total weight of the polyurethane in the polishing layer.

In accordance with the methods of making polishing pads in accordance with the present invention, chemical mechanical polishing pads can be provided with a groove pattern cut into their polishing surface to promote slurry flow and to remove polishing debris from the pad-wafer interface. Such grooves may be cut into the polishing surface of the polishing pad either using a lathe or by a CNC milling machine.

In accordance with the methods of using the polishing pads of the present invention, the polishing surface of the CMP polishing pads can be conditioned. Pad surface "conditioning" or "dressing" is critical to maintaining a consistent polishing surface for stable polishing performance. Over time the polishing surface of the polishing pad wears down, smoothing over the microtexture of the polishing surface—a phenomenon called "glazing". Polishing pad conditioning is typically achieved by abrading the polishing surface mechanically with a conditioning disk. The conditioning disk has a rough conditioning surface typically comprised of imbedded diamond points. The conditioning process cuts microscopic furrows into the pad surface, both abrading and plowing the pad material and renewing the polishing texture.

Conditioning the polishing pad comprises bringing a conditioning disk into contact with the polishing surface either during intermittent breaks in the CMP process when polishing is paused ("ex situ"), or while the CMP process is underway ("in situ"). Typically the conditioning disk is rotated in a position that is fixed with respect to the axis of rotation of the polishing pad, and sweeps out an annular conditioning region as the polishing pad is rotated.

The chemical mechanical polishing pad of the present invention can be used for polishing a substrate selected from at least one of a magnetic substrate, an optical substrate and a semiconductor substrate.

Preferably, the method of polishing a substrate of the present invention, comprises: providing a substrate selected from at least one of a magnetic substrate, an optical substrate and a semiconductor substrate (preferably a semiconductor substrate, such as a semiconductor wafer); providing a chemical mechanical polishing pad according to the present invention; creating dynamic contact between a polishing surface of the polishing layer and the substrate to polish a surface of the substrate; and, conditioning of the polishing surface with an abrasive conditioner.

Some embodiments of the present invention will now be described in detail in the following Examples:

The following raw materials were used in the Examples:

MONDUR™ Grade II TDI: Toluene Diisocyanate (Covestro Pittsburgh, Pa.);

TERATHANE™ 1000: Polytetramethylene ether glycol at 1000 Mw (Invista, Wichita, Kans.)

Adiprene™ LF 750D: Low [free TDI <0.5% max] prepolymer (Chemtura, Philadelphia, Pa.);

3,5-Dimethylpyrazole (Aldrich Chemicals, St. Louis, Mo.);

Lonzacure™ MCDEA: 4,4'-methylene-bis(3-chloro-2,6-diethylaniline), (Lonza Ltd., Switzerland);

Ethacure™ 100: Mixture of 3,5-diethyltoluene-2,4-diamine and 3,5-diethyltoluene-2,6-diamine (Albemarle, Baton Rouge, La.); and, Expancel™ 920 DE 40 d30 beads: Fluid filled polymeric microspheres with nominal diameter of 40 μm and true density of 30 g/l (Akzo Nobel, Arnhem, NL).

Blocked Prepolymer 1:

A polyisocyanate prepolymer with roughly 6.0 wt. % free NCO was synthesized by mixing 26 wt. % MONDUR Grade II TDI and 74 wt. % TERATHANE 1000 polyol at 75° C. for 4 hours. Two separate batches of Blocked Prepolymer 1 were made. To 574 grams of this prepolymer, roughly 80 g of 3,5-dimethylpyrazole was added at 65° C. in a four-neck glass flask under nitrogen atmosphere with agitation. The temperature of the mixture was maintained at from 70 to 80° C. by varying the addition rate of the 3,5-dimethylpyrazole. Once the amount of 3,5-dimethylpyrazole was added and fully dissolved, the temperature of the reactor was raised to 80° C. and maintained there while agitating for 1-2 hours to complete the blocking reaction. The end point of the blocking reaction was monitored by FTIR and determined by the disappearance of the NCO peak.

Blocked Prepolymer 2:

82 grams of 3,5-dimethylpyrazole was added to 400 grams of an Adiprene LF 750 D polyisocyanate prepolymer (having an 8.75 wt. % NCO content) at 65° C. in a four-neck glass flask under nitrogen atmosphere with agitation. The temperature of the mixture was maintained from 70 to 80° C. by varying addition rate of the 3,5-dimethylpyrazole. Once the amount of 3,5-dimethylpyrazole was added and fully dissolved, the temperature of the reactor was raised to 80° C. and was maintained there while agitating for 1-3 hours to complete the blocking reaction. The end point of the blocking reaction was monitored by FTIR and determined by the disappearance of the NCO peak.

COMPARATIVE EXAMPLE 1

98.8 g of blocked prepolymer 1 (5.88 wt. % blocked NCO content) preheated to 70° C. was mixed with 22 g of MCDEA (0.95 equiv. $NH_2$ groups per total equiv. NCO groups in the reaction mixture) preheated to 100° C. in a high speed mixer, DAC 600.1 FVZ, (FlackTek speed mixer, FlackTek Inc., Landrum, S.C.) at 2300 rpm for 30 s. The material was then cast in an open circular (10.16 cm diameter) mold and cured at 120° C. for 17 h. The resulting 0.36 cm thick plaque did not show any warping or cracks. Tensile data was collected according to ASTM D-1708-13 (2013) this material showed an ultimate elongation of 446% and a tensile strength of 18.8 MPa.

EXAMPLE 1

31 g of blocked prepolymer 1 (5.95 wt. % blocked NCO content) preheated to 80° C. was mixed with 7 g of MCDEA (0.95 equiv $NH_2$ groups per total equiv. of NCO groups in the reaction mixture) preheated to 100° C. in a high speed mixer, DAC 600.1 FVZ, FlackTek speed mixer (FlackTek Inc.) at 2300 rpm for 60 s. The material was then cast in a square (10.16 cm×10.16 cm) open mold and cured at 120° C. for 22 h. The resulting (0.15 cm) thick plaque showed a few cracks. Tensile data was collected according to ASTM D-1708, this material showed an ultimate elongation of 474% and a tensile strength of 48 MPa Example 1 demonstrates that curing a material for a longer period above the deblocking temperature of the blocking agent leads to improved properties, including a boost in tensile strength. This is because the blocking agent is released from the matrix and does not plasticize the resulting product.

COMPARATIVE EXAMPLE 2

50 g of blocked prepolymer 2 preheated to 80° C. was mixed with 15.8 g of MCDEA (0.95 equiv $NH_2$ groups per total equiv. of NCO groups in the reaction mixture) (melted at 110° C. then cooled to 80-90° C.) in a high speed mixer, DAC 600.1 FVZ, FlackTek speed mixer (FlackTek Inc.) at 2300 rpm for 60 s. The material was then cast in a square (10.12 cm×10.12 cm) open mold and cured at 120° C. for 22 h. The resulting 0.15 cm thick plaque showed a few cracks.

Comparative Example 2 shows that warping/cracking occurs when the reaction mixture comprises more than the inventive proportion of one or more blocked diisocyanate, polyisocyanate or polyisocyanate prepolymer.

COMPARATIVE EXAMPLE 3

50 g of blocked prepolymer 2 heated to 80° C. was mixed with 7.5 g of Ethacure™-100 (0.95 equiv $NH_2$ groups per total equiv. NCO groups in the reaction mixture) diamine curative heated at 80° C. in a high speed mixer, DAC 600.1 FVZ, FlackTek speed mixer (FlackTek Inc.) at 2300 rpm for 60 s. The material was then cast in a square (10.12 cm×10.12 cm) open mold and cured at 120° C. for 20 h. The resulting 0.15 cm. thick plaque was warped but did not show cracks.

As shown in Comparative Example 3, above, a warping and/or cracking phenomenon occurs when too much of a blocked diisocyanate, polyisocyanate or to polyisocyanate prepolymer is used to make a casting.

EXAMPLE 2

5 g of Adiprene™ LF 750 D (8.75 wt. % NCO) polyisocyanate prepolymer was mixed with 18.8 g of blocked prepolymer 2 to furnish an 80 wt. % blocked prepolymer. This material was heated to 50° C. and then mixed with 8.5 g of MCDEA (melted at 110° C. then cooled to 90-100° C.) (1.05 equiv $NH_2$ groups per total equiv. of NCO groups in the reaction mixture) in a high speed mixer, DAC 600.1 FVZ, FlackTek speed mixer (FlackTek Inc.) at 2300 rpm for 60 s. The material was then cast in a square (10.12 cm×10.12 cm) open mold and cured at 120° C. for 23 h. The resulting molding was a flat square plaque without defects. Accordingly, the present invention allows for the synthesis of defect free elastomers from the reaction mixtures of the present invention including amines that would be too reactive without the incorporation of blocking agent. For example, warping and cracks can be avoided with use of a mixture of a limited amount of polyisocyanate prepolymer with a blocked polyisocyanate prepolymer and MCDEA as a diamine curative in accordance with the present invention.

COMPARATIVE EXAMPLE 4

25 g of Adiprene™ LF 750 D (8.85 wt. % NCO) polyisocyanate prepolymer heated to 60° C. was mixed with 9.7 g of MCDEA heated at 100° C. (0.95 equiv $NH_2$ per blocked NCO) in a high speed mixer, DAC 600.1 FVZ, FlackTek speed mixer (FlackTek Inc.) at 2300 rpm for 60 s. The material in the cup gelled less than 90 s after mixing was completed. The gel time is too rapid for the synthesis of CMP pads which typically require at least 2 min of open time for casting.

EXAMPLE 3

4 g of Adiprene™ LF 750 D (8.75 wt. % NCO) polyisocyanate prepolymer was mixed with 16.1 g of blocked prepolymer 2 to furnish a mixture containing 80 wt. % of blocked prepolymer. This material was heated to 50° C. and then mixed with 6.6 g of MCDEA (melted at 110° C. then cooled to 80-90° C.) in a high speed mixer, DAC 600.1 FVZ, FlackTek speed mixer (FlackTek Inc.) at 2300 rpm for 60 s. This material was then loaded onto an AR2000 rheometer (TA Instruments, New Castle Del.) and the viscosity was recorded under isothermal conditions at 85° C. under constant shear of 10/s for 6 min. The initial viscosity of the mixture was 2131 mPa·s. After 5.5 min the viscosity was 9008 mPa·s As Comparative Example 4 and Example 3 demonstrate, mixtures of blocked and unblocked prepolymers have an increased open time or gel time relative to completely unblocked systems that allows them to be used in the synthesis of CMP pads; whereas use of just a polyisocyanate prepolymer results in a composition that gels too rapidly for use in making polishing pads.

EXAMPLE 4: Pad According to the Present Invention 700 g of blocked prepolymer 2, DMP blocked Adiprene™ LF750D polyisocyanate prepolymer heated to 80° C., was mixed to 500 g of Adiprene™ LF750D polyisocyanate prepolymer heated to 60° C. and 10.5 g of Expancel™ 920DE40d30 fluid filled microspheres in a Vortex mixer, (VM-2500 StateMix Ltd, Winnipeg, Canada) at 1000 rpm for 30 s, forming a preblend containing about 58 wt. % of blocked prepolymer 2 and having a stoichiometry of total $NH_2$ groups to total NCO groups of 1.05:1. The preblend was then mixed with 491 g of MCDEA heated to 110° C. in the Vortex mixer for another 30 s at 1000 rpm. The final mixture was drawn down on a 914 by 914 mm Teflon™ polymer (DuPont, Wilmington, Del.) coated plate with a gap of 2 mm formed by a Teflon™ polymer coated bar. The drawn-down pad was cured in an oven at 104° C. for 16 h, and later post-cured for an additional 24 h at 120° C. to remove residual blocking agent.

The post cured pad was conditioned at 23° C. and 50% relative humidity for 5 days before testing for mechanical properties. Tensile properties were obtained at 500 mm/min cross-head speed using an Alliance RT/5 materials testing system (MTS Systems Corp., Berlin, N.J.). Dynamic properties were tested in rectangular shear torsion mode (ASTM 5279-13, 2013) at 10 rad/s frequency and 3° C./min temperature ramp using a RDA 3 instrument from Rheometrics (now TA Instruments, New Castle, Del.). Table 1, below shows the properties of the resulting pad.

TABLE 1

| | | Pad Properties | | | | | | |
|---|---|---|---|---|---|---|---|---|
| Example | Density, g/cm$^3$ | Hardness (Shore D 2 Sec) | Hardness (Shore D 15 Sec) | G' 30° C., MPa | G' 40° C., MPa | G" 40° C., MPa | G' 30 C./ G'90 | G' 90° C., MPa |
| 4 | 0.86 | 61 | 59 | 195 | 174 | 12.9 | 1.7 | 111 |

| Example | Density, g/cm$^3$ | Tensile Strength, MPa | Elongation % | Modulus, MPa | 25% Modulus MPa | 50% Modulus MPa | Toughness MPa |
|---|---|---|---|---|---|---|---|
| 4 | 0.86 | 21.8 | 71 | 227 | 19.5 | 22.2 | 14.3 |

EXAMPLE 4A

The Example 4 pad was machined on both sides to reduce the thickness down to 1.27 mm (50 mils) and perforated with 1.7 mm diameter through holes spaced 5.4 mm in machine direction and 9.8 mm in cross direction. The perforated Example 4 pad was stacked to a Suba™ 400 non-woven polyurethane impregnated polyester felt sub-pad (Nitta Haas, Osaka, Japan) using a double sided pressure sensitive adhesive (PSA).

COMPARATIVE EXAMPLE 5

As a control, an IC1000™ pad (The Dow Chemical Co., Midland, Mich.) of the same 1.27 mm (50-mil) thick was finished with the same configuration and stacked with the same Suba™ 400 sub-pad and the same pressure sensitive adhesive. The polishing comparison used the following method.

Polishing Evaluation:

Polishing was carried on a 300 mm CMP polisher (model FREX 300 by EBARA Corporation, Tokyo, Japan). The polishing medium (e.g., slurry) used in the polishing experiments was a cerium oxide containing slurry (average abrasive size 236 nm, abrasive loading of 5 wt %, and pH of 8.4) diluted with deionized water (DIW) at 1 to 9 slurry to DIW ratio. The polishing conditions used in all of the polishing experiments included a platen speed of 80 rpm, a carrier speed of 83 rpm, with a polishing slurry flow rate of 200 ml/min and a polishing down force of 50 kPa. An EP1AG-150730-NC diamond conditioning disk (Kinik Company, Taipei City, Taiwan) was used to condition the chemical mechanical polishing pads. The chemical mechanical polishing pads were each broken in with the conditioner ex situ using a down force of 100 N for 20 minutes, with pad table rotating at 20 rpm, and dresser at 16 rpm. The polishing pads were further conditioned ex situ prior to polishing each wafer substrate using a down force of 100 N for 30 seconds, at 20 rpm table speed and 16 rpm dresser speed. The removal rates (RR) of silicon oxide film from tetraethoxy silicate (TEOS) were determined by measuring the film thickness before and after polishing.

The substrates polished were a tetraethoxy silicate (TEOS) blanket wafer, a blanket oxide wafer with minimal topography, followed by an oxide pattern wafer. The oxide pattern wafer has a typical step height of 5500 Å of various pattern densities, i.e., varying line/space width and pitch. The film stack for the oxide pattern wafer is about 10,000 Å of TEOS and 1500 Å of silicon nitride deposited on a patterned silicon substrate.

Each polishing pad was monitored at 10, 30, 60, and 90 seconds to determine removal of the substrate and removal rate (RR) was measured by optical interference using a RE-3200 Ellipsometric Film Thickness Measurement System (Screen Holdings Co., Ltd. Kyoto, Japan) and recorded. Removal rate is the amount of substrate material removed per minute; average RR is the average of removal rates for 3 substrate trials. NU % refers to non-uniformity as a percentage of RR variation within each wafer excluding 3 mm at the wafer edge. For each substrate tested, five dummy wafers were polished in between each wafer for which RR and NU % were recorded; a total of three wafers of each kind of substrate were tested and observed for the RR and NU % tests. The non-uniformity (NU) of the substrate was measured after polishing. Results are given in Table 2, below.

TABLE 2

| | Polishing Results | | | | |
|---|---|---|---|---|---|
| | Wafer Run No. | | | Average RR | Normalized RR |
| Example | 3 | 9 | 15 | Å/min | % |
| Comparative 5 (RR) | 5257 | 5425 | 5487 | 5390 | 100 |
| 4A (RR) | 10603 | 10139 | 10263 | 10335 | 192 |
| Comparative 5 (NU %) | 17.4 | 17.1 | 13.9 | n/a | n/a |
| 4A (NU %) | 13.8 | 12.8 | 13.2 | n/a | n/a |

As shown in Table 2, above, the Example 4A pad of the present invention, exhibited about 90% higher TEOS removal rate than the Comparative Example 5, an IC1000™ pad (The Dow Chemical Co., Midland, Mich.) of the same configuration. The Example 4A pad also gave comparable within wafer non-uniformity (NU) compared with the Comparative Example 5 pad.

Planarization Efficiency:

To assess the ability of a pad to remove material in the step height reduction from a non-level and non-uniform substrate, a substrate pattern wafer with a step height of 5000 Å (CMP Characterization Mask Set, MIT-STI-764 pattern) was formed by chemical vapor deposition of 7000 Å TEOS in a lined pattern that includes rectangular sections of varying pitches (from 1 to 1000 μm at 50% pattern density) and pattern densities (from 0% to 100% at a 100 μm line pitch). The pattern wafer having a target step height of 5000 Å is made by sequential deposition of a 7000 Å TEOS oxide film on top of a 1500 Å silicon nitride film on top of a silicon substrate etched 3500 Å deep with the various pattern densities. Planarization efficiency was evaluated by optical interference using a RE-3200 Ellipsometric Film Thickness Measurement System (Screen Holdings Co) at pattern line/space (L/S) intervals of 4000/4000 μm, 500/500 μm, 250/250 μm, and 25/25 μm. Results are shown in Table 3, below. In Table 3, below an Event refers to an observed point in time in the polishing of a single substrate wafer.

TABLE 3

Planarization Efficiency and Polishing Results

| Event No. | Polishing time | Step Height (Å) at given feature sizes | | | | |
|---|---|---|---|---|---|---|
| | | 4000/4000 μm | 500/500 μm | 250/250 μm | 100/100 μm | 25/25 μm |
| Comparative Example 5 | | | | | | |
| 1 | 0 | 5404 | 5393 | 5428 | 5463 | 5476 |
| 2 | 45 | 5200 | 2997 | 2882 | 2867 | 2761 |
| 3 | 60 | 5085 | 1852 | 1588 | 1381 | 1057 |
| Example 4A | | | | | | |
| 1 | 0 | 5412 | 5393 | 5428 | 5462 | 5475 |
| 2 | 45 | 5078 | 2315 | 2178 | 2102 | 1779 |
| 3 | 60 | 4569 | 585 | 385 | 237 | 74 |

As shown in Table 3, above, the pad of Example 4A delivered much faster step height reduction than the control IC1000 pad of Comparative Example 5, due to its much higher RR.

A polishing evaluation, as described above, was repeated except at 41.3 kPa polishing down force, and the results are presented in Table 4, below.

Defectivity:

The creation of defects during polishing was measured using a Hitachi High-Tech™ LS6600 metrology tool (Hitachi High Technologies Corporation, Tokyo, Japan) wherein the substrate was cleaned with HF (2 wt. % in water) to an etching amount of 400 Å TEOS. Target remaining TEOS thickness was 6000 Å. Defect count was determined in a wafer substrate which is not a pattern wafer by an LS6600 wafer surface inspection system with 0.2 μm resolution. Results are shown in Table 4, below.

TABLE 4

Polishing Efficiency and Defects

| Example | 4A | Comparative 5 |
|---|---|---|
| Blanket TEOS RR, Å/min | 8055 | 4678 |
| Defect count, scratches | 17 | 59 |
| Defect count, particles | 16 | 31 |

As shown in Table 4, above, the Example 4A pad gave a 72% higher removal rate and better defect performance than the pad of Comparative Example 4. The pad of Example 4A also achieved faster step height reduction, thus better planarization capability.

We claim:

1. A chemical mechanical (CMP) polishing pad for polishing a substrate chosen from at least one of a magnetic substrate, an optical substrate and a semiconductor substrate comprising a polishing layer adapted for polishing the substrate which is a polyurethane reaction product of a reaction mixture consisting essentially of (i) polytetramethylene ether glycol polyisocyanate prepolymer, wherein the prepolymer has an unreacted 8 to 10 wt. % NCO content, in the amount of from 15 to 60 wt. % polyisocyanate prepolymer, based on the total weight of all diisocyanates, polyisocyanates and polyisocyanate prepolymers in the reaction mixture, (ii) blocked polyisocyanate prepolymer that contains 3,5-dimethylpyrazole blocking agent and has a deblocking temperature of from 80 to 160° C. in the amount of from 40 to 85 wt. % based on the total weight of all diisocyanates, polyisocyanates and polyisocyanate prepolymers in the reaction mixture, and (iii) 4,4'-methylenebis(3-chloro-2,6-diethylaniline) curative, wherein the reaction mixture has a gel time at 80° C. and a pressure of 101 kPa of from 2 to 15 minutes, further wherein, the polyurethane reaction product has a residual blocking agent content of 2 wt. % or less and, still further wherein, the polishing layer exhibits a density of from 0.6 to 1.2 g/cm$^3$ and wherein the polishing layer includes polymeric microspheres and the polymeric microspheres comprise shell walls of either polyacrylonitrile or polyacrylonitrile copolymer.

2. The CMP polishing pad as claimed in claim 1, wherein the polishing pad has a free isocyanate content of 0.1 wt. %, or less, based on the total weight of the polyurethane reaction product.

3. The CMP polishing pad as claimed in claim 1, wherein the stoichiometric ratio of the sum of the amine ($NH_2$) groups and the hydroxyl (OH) groups) in the (iii) amine curative plus any free hydroxyl groups in the reaction mixture to the unreacted and blocked isocyanate groups in reaction mixture is from 0.80:1 to 1.20:1.

\* \* \* \* \*